US012157586B2

(12) United States Patent
King et al.

(10) Patent No.: US 12,157,586 B2
(45) Date of Patent: Dec. 3, 2024

(54) PROPULSION SYSTEM FOR SPACECRAFT

(71) Applicant: ORBION SPACE TECHNOLOGY, INC., Houghton, MI (US)

(72) Inventors: Lyon B. King, Allouez, MI (US); Jason M. Makela, Hancock, MI (US); Jason D. Sommerville, Hancock, MI (US); Robert Washeleski, Hancock, MI (US)

(73) Assignee: ORBION SPACE TECHNOLOGY, INC., Houghton, MI (US)

( * ) Notice: Subject to any disclaimer, the term of this patent is extended or adjusted under 35 U.S.C. 154(b) by 0 days.

(21) Appl. No.: 17/918,303

(22) PCT Filed: Oct. 9, 2020

(86) PCT No.: PCT/US2020/055098
§ 371 (c)(1),
(2) Date: Oct. 11, 2022

(87) PCT Pub. No.: WO2021/225621
PCT Pub. Date: Nov. 11, 2021

(65) Prior Publication Data
US 2023/0150697 A1 May 18, 2023

Related U.S. Application Data

(60) Provisional application No. 63/022,233, filed on May 8, 2020.

(51) Int. Cl.
*F03H 1/00* (2006.01)
*B64G 1/40* (2006.01)
(Continued)

(52) U.S. Cl.
CPC ............. *B64G 1/401* (2013.01); *B64G 1/402* (2013.01); *B64G 1/405* (2013.01); *B64G 1/415* (2023.08);
(Continued)

(58) Field of Classification Search
CPC ........ B64G 1/402; B64G 1/405; F03H 1/0075
See application file for complete search history.

(56) References Cited

U.S. PATENT DOCUMENTS 3,112,612 A * 12/1963 Adamson .................. F02K 9/97
60/228
3,572,029 A 3/1971 Swift, Jr.
(Continued)

FOREIGN PATENT DOCUMENTS

CN 1343869 A 4/2002
CN 105067293 A 11/2015
(Continued)

OTHER PUBLICATIONS

International Search Report and Written Opinion for Application No. PCT/US2020/026420 dated Jun. 16, 2020 (16 pages).
(Continued)

*Primary Examiner* — Lorne E Meade
(74) *Attorney, Agent, or Firm* — Michael Best & Friedrich LLP

(57) ABSTRACT

A thrust generator is provided for producing thrust to move a spacecraft. The thrust generator includes a housing having a first end and an opposing second end. The first end is associated with a mount for coupling to the spacecraft. The housing further defines a central axis extending through the first end and the second end. The second end defines an annular propulsion outlet. At least one nozzle is positioned proximate the second end. The thrust generator is selectively operable in a first mode in which the thrust generator uses (Continued)

propellant to electrostatically generate thrust via the annular propulsion outlet, and a second mode in which the thrust generator uses propellant to gas-dynamically generate thrust via the at least one nozzle.

3 Claims, 9 Drawing Sheets

(51) Int. Cl.
  *F02K 9/62* (2006.01)
  *F02K 9/80* (2006.01)
  *B64G 1/42* (2006.01)
(52) U.S. Cl.
  CPC .................. *F02K 9/62* (2013.01); *F02K 9/80* (2013.01); *F03H 1/0075* (2013.01); *B64G 1/428* (2013.01)

(56) References Cited

U.S. PATENT DOCUMENTS

| | | | | |
|---|---|---|---|---|
| 3,597,923 | A * | 8/1971 | Simon | F02K 9/44 60/260 |
| 3,807,657 | A | 4/1974 | Brill | |
| 5,152,169 | A | 10/1992 | Summerfield et al. | |
| 5,763,989 | A | 6/1998 | Kaufman | |
| 5,845,880 | A | 12/1998 | Petrosov et al. | |
| 5,973,447 | A | 10/1999 | Mahoney et al. | |
| 6,032,904 | A * | 3/2000 | Hosick | B64G 1/26 244/169 |
| 6,619,031 | B1 | 9/2003 | Balepin | |
| 6,982,520 | B1 | 1/2006 | de Grys | |
| 7,395,656 | B2 * | 7/2008 | Rooney | B64G 1/405 60/202 |
| 7,624,566 | B1 | 12/2009 | Manzella et al. | |
| 9,194,379 | B1 | 11/2015 | Biblarz et al. | |
| 10,023,328 | B2 * | 7/2018 | Zurbach | F02K 9/62 |
| 11,148,833 | B1 * | 10/2021 | Wu | B64G 1/2427 |
| 11,198,523 | B2 | 12/2021 | King | |
| 2001/0039832 | A1 | 11/2001 | Sondey | |
| 2002/0145090 | A1 | 10/2002 | Schenk, Jr. | |
| 2002/0145389 | A1 | 10/2002 | Burgova et al. | |
| 2005/0230557 | A1 | 10/2005 | Aghili | |
| 2005/0237000 | A1 | 10/2005 | Zhurin | |
| 2006/0076872 | A1 | 4/2006 | DeGrys | |
| 2006/0168936 | A1 | 8/2006 | Rooney | |
| 2006/0186837 | A1 | 8/2006 | Hruby et al. | |
| 2006/0290287 | A1 | 12/2006 | Kuninaka | |
| 2007/0018034 | A1 | 1/2007 | Dickau | |
| 2008/0136309 | A1 | 6/2008 | Chu et al. | |
| 2008/0314134 | A1 | 12/2008 | Mainville | |
| 2015/0021439 | A1 | 1/2015 | Duchemin et al. | |
| 2015/0151855 | A1 | 6/2015 | Richards et al. | |
| 2015/0184988 | A1 | 7/2015 | Facciano et al. | |
| 2016/0001898 | A1 | 1/2016 | Duchemin et al. | |
| 2016/0273523 | A1 | 9/2016 | King et al. | |
| 2017/0088293 | A1 | 3/2017 | Zurbach et al. | |
| 2017/0191471 | A1 | 7/2017 | Berg et al. | |
| 2017/0210493 | A1 | 7/2017 | Marchandise | |
| 2020/0102100 | A1 | 4/2020 | Lozano et al. | |

FOREIGN PATENT DOCUMENTS

| | | | |
|---|---|---|---|
| CN | 106662041 | A | 5/2017 |
| CN | 106828982 | A | 6/2017 |
| CN | 107187618 | A | 9/2017 |
| CN | 107352051 | A | 11/2017 |
| CN | 108313328 | A | 7/2018 |
| CN | 108317061 | A | 7/2018 |
| CN | 108367815 | A | 8/2018 |
| CN | 110104222 | A | 8/2019 |
| CN | 110271693 | A | 9/2019 |
| CN | 115720560 | A | 2/2023 |
| EP | 1161855 | A1 | 12/2001 |
| EP | 3620394 | A1 | 3/2020 |
| ES | 2733773 | A1 | 12/2019 |
| JP | S62258900 | A | 11/1987 |
| JP | H0771361 | A * | 3/1995 .......... F03H 1/0075 |
| JP | 2015182706 | A | 10/2015 |
| RU | 2377441 | C1 | 12/2009 |
| RU | 2474984 | C1 | 2/2013 |
| RU | 2546913 | C2 | 4/2015 |
| RU | 2631247 | C2 | 9/2017 |
| RU | 2659009 | C1 | 6/2018 |
| RU | 2738136 | C1 | 12/2020 |
| WO | 02069364 | A2 | 9/2002 |
| WO | 2010036291 | A2 | 4/2010 |
| WO | 2015031450 | A1 | 3/2015 |
| WO | 2016181360 | A1 | 11/2016 |
| WO | 2020005290 | A1 | 1/2020 |

OTHER PUBLICATIONS

International Search Report and Written Opinion for Application No. PCT/US2019/026144 dated Jul. 5, 2019 (12 pages).
International Preliminary Report on Patentability for Application No. PCT/US2019/026144 dated Oct. 15, 2020 (6 pages).
International Search Report and Written Opinion for Application No. PCT/US18/40419 dated Oct. 1, 2018 (11 pages).
International Preliminary Report on Patentability for Application No. PCT/US2018/040419 dated Dec. 29, 2021 (6 pages).
International Search Report and Written Opinion for Application No. PCT/US20/55119 dated Jan. 11, 2021 (15 pages).
International Search Report and Written Opinion for Application No. PCT/US20/55098 dated May 13, 2021 (14 pages).
International Search Report and Written Opinion for Application No. PCT/US20/55063 dated Jul. 1, 2021 (15 pages).
Migliaccio et al., "Vacuum testing of a micropropulsion system based on solid propellant cool gas generators," 61st International Astronautical Congress, Prague, Czech Republic, Sep. 27-Oct. 1, 2010.
Russian Federal Service on Intellectual Property Office Action and Search Report for Application No. 2020140217 dated Dec. 20, 2021 (21 pages including English translation).
European Patent Office Extended Search Report for Application No. 20828644.3 dated Jul. 8, 2022 (8 pages).
International Preliminary Report on Patentability for Application No. PCT/US2020/055098 dated Nov. 8, 2022 (8 pages).
International Preliminary Report on Patentability for Application No. PCT/US2020/055063 dated Nov. 8, 2022 (7 pages).
European Patent Office Extended Search Report for Application No. 20934846.5 dated Feb. 1, 2024 (9 pages).
European Patent Office Extended Search Report for Application No. 20934808.5 dated Mar. 12, 2024 (9 pages).
European Patent Office Extended Search Report for Application No. 20934353.2 dated Feb. 26, 2024 (10 pages).
Peng et al., Acta Physica Sinica, "On the role of magnetic field intensity on the discharge characteristics of Hall thruster", No. 04, dated Apr. 15, 2024, p. 2535-2542 (16 pages including English machine translation).

* cited by examiner

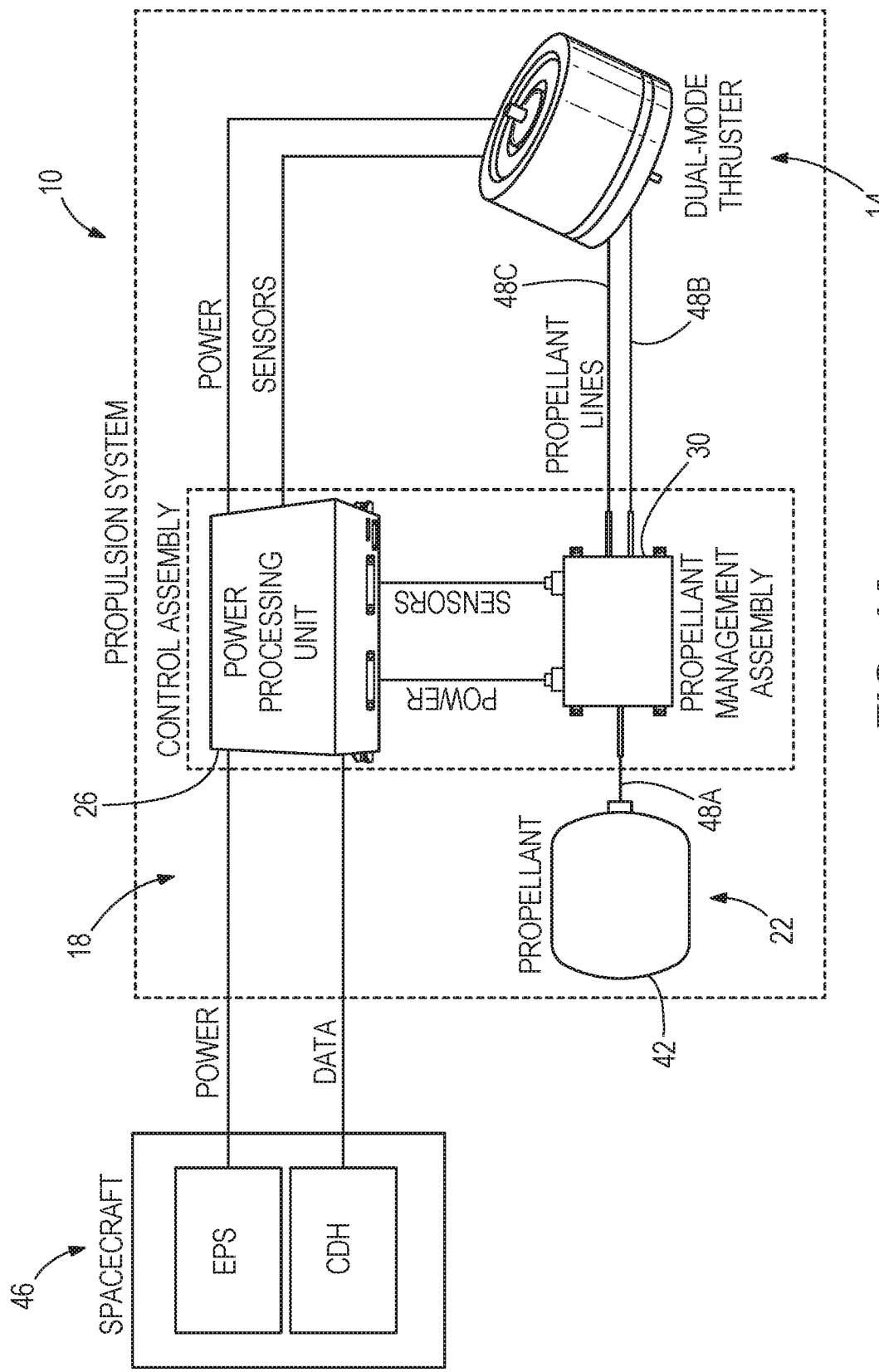

PROPULSION SYSTEM FOR SPACECRAFT

CROSS-REFERENCE TO RELATED APPLICATIONS

This application is a U.S. national stage entry of International Patent Application No. PCT/US2020/055098, filed on Oct. 9, 2020, which claims priority to U.S. Provisional Patent Application No. 63/022,233, filed on May 8, 2020, the entire contents of each of which are fully incorporated herein by reference.

BACKGROUND

The present disclosure relates to a propulsion system for a spacecraft, and more particularly to a multiple mode propulsion system.

SUMMARY OF THE DISCLOSURE

The disclosure provides, in one configuration, a thrust generator for producing thrust to move a spacecraft. The thrust generator includes a housing having a first end and an opposing second end. The first end is associated with a mount for coupling to the spacecraft. The housing further defines a central axis extending through the first end and the second end. The second end defines an annular propulsion outlet. At least one nozzle is positioned proximate the second end. The thrust generator is selectively operable in a first mode in which the thrust generator uses propellant to electrostatically generate thrust via the annular propulsion outlet, and a second mode in which the thrust generator uses propellant to gas-dynamically generate thrust via the at least one nozzle.

The disclosure provides, in another configuration, a thrust generator for producing thrust to move a spacecraft. The thrust generator is configured to receive a supply of propellant and to operate in a first mode in which the thrust generator electrostatically generates thrust and in a second mode in which the thrust generator gas-dynamically generates thrust.

The disclosure provides, in yet another configuration, a thrust generator for producing thrust to move a spacecraft. The thrust generator includes a housing having a first end and an opposing second end. The first end is associated with a mount for coupling to the spacecraft. An electric propulsion subsystem is at least partially contained within the housing. A gas dynamic propulsion subsystem is integrated with the electric propulsion subsystem and at least partially contained within the housing. The thrust generator is configured to operate either the electric propulsion subsystem or the gas dynamic propulsion subsystem.

Other aspects of the disclosure will become apparent by consideration of the detailed description and accompanying drawings.

BRIEF DESCRIPTION OF THE DRAWINGS

FIG. 1A is a block diagram of a propulsion system embodying the present disclosure, including a thrust generator, a control assembly, and a propellant storage assembly.

Figure 1B:
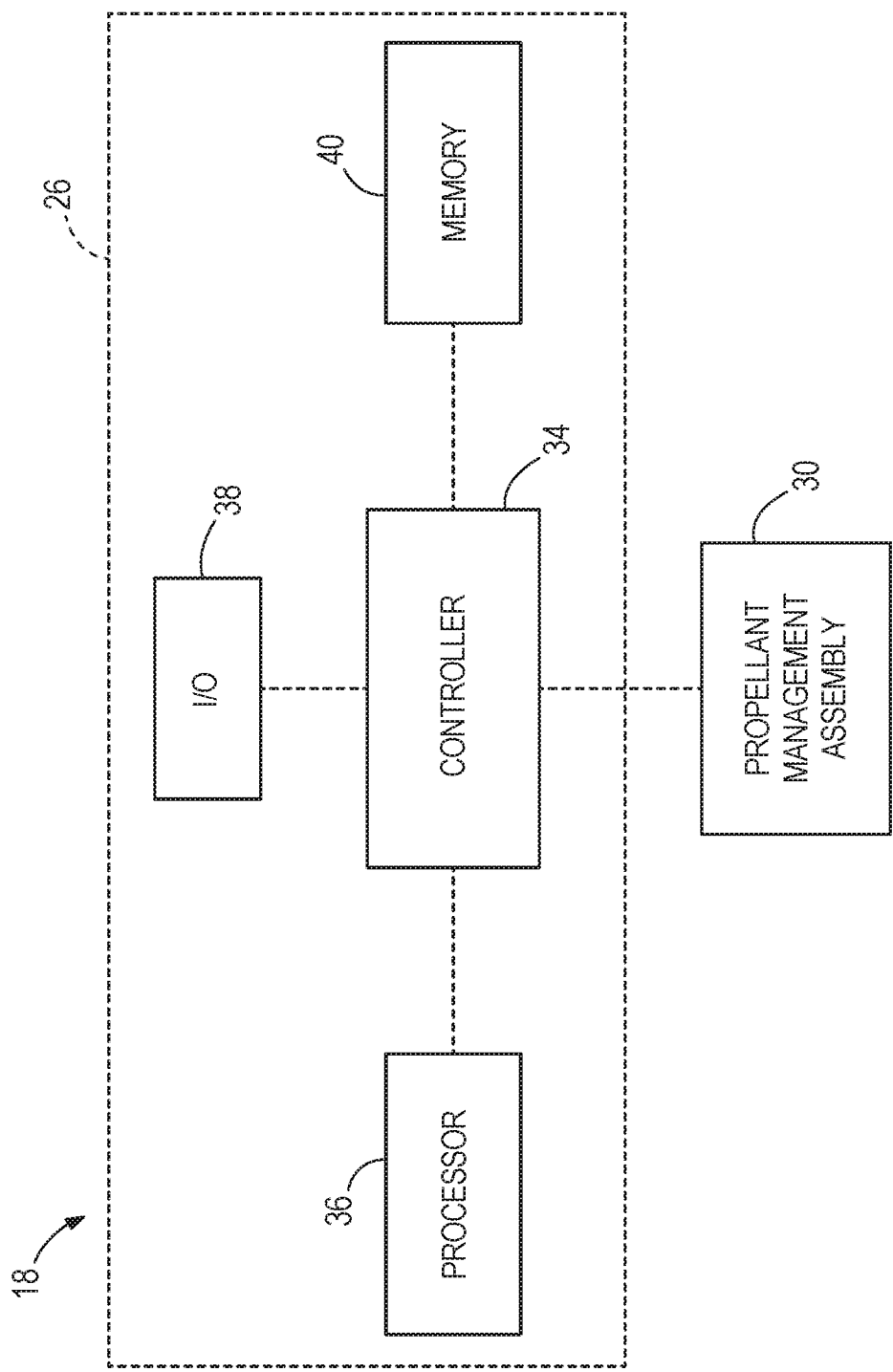
FIG. 1B is a block diagram of the control assembly of FIG. 1A.

Before any embodiments of the disclosure are explained in detail, it is to be understood that the disclosure is not limited in its application to the details of the formation and arrangement of components set forth in the following description or illustrated in the accompanying drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

FIG. 1A illustrates schematically a propulsion system 10 for a spacecraft. The propulsion system 10 includes a thrust generator 14, a control assembly 18, and a propellant storage assembly 22. The thrust generator 14 is securable to and configured to generate a thrust to move the spacecraft. The control assembly 18 is configured to selectively adjust the operation of the propulsion system 10, and therefore the thrust generator 14, between a plurality of modes through transfer of propellant from the propellant storage assembly 22.

The propulsion system 10 is configured to support two or more types of thrust generation via a single thrust generator such that the propulsion system 10 can be characterized as a single multiple-mode propulsion system or an integrated multiple-mode propulsion system. For example, the thrust generator 14 may include characteristics of two or more of a Hall-effect thruster (HET), ion thruster, arcjet, resistojet, colloid thruster, electrospray thruster, pulsed plasma thruster, magneto plasma dynamic thruster, pulsed inductive thruster, field emission electric propulsion system, cold gas thruster, solid motor, and liquid thruster (e.g. biprop, monoprop, and water), etc. The propulsion system 10 achieves both high thrust for fast maneuvering and high specific impulse for fuel efficiency.

Due to the aforementioned characteristics, the propulsion system 10 is configured to support a plurality of different types of propulsion. For example, in one embodiment, the propulsion system 10 is configured to support electric propulsion (EP) (in the manner of a HET) to electrostatically generate thrust and gas dynamic (GD) propulsion (in the manner of a cold gas thruster) to gas-dynamically generate thrust. The propulsion system 10 and thrust generator 14 are not limited, however, to EP and GD types of propulsion. The thrust generator 14 will be described in further detail herein.

With continued reference to FIG. 1A, the control assembly 18 includes a power processing unit (PPU) 26 and a propellant management assembly (PMA) 30.

The PPU 26 is electrically connected to the thrust generator 14 and to the PMA 30. In the illustrated embodiment, the PPU 26 is configured to supply power to the thrust generator 14 and/or to the PMA 30, and to receive signals or data from sensors (not shown) from the thrust generator 14 and/or from the PMA 30. Each sensor on or associated with the thrust generator 14 and/or the PMA 30 is configured to detect a condition of the respective thrust generator 14 and/or PMA 30. For example, the one or more sensors may be configured to detect whether thrust is being produced by the thrust generator 14, whether propellant is flowing from the propellant storage assembly 22 to the thrust generator 14, the flow rate of propellant, temperature(s), etc.

With reference to FIG. 1B, the PPU 26 further includes a controller 34. The controller 34 receives and transmits information to and from the thrust generator 14 and/or the PMA 30. The controller 34 further includes a processor 36, an input/output (I/O) 38, and a memory 40 for storing, interpreting, and communicating the information to and from the thrust generator 14 and/or the PMA 30.

The PPU 26 of the control assembly 18 is further electrically connectable to the spacecraft control assembly 46. In the illustrated embodiment, the PPU 26 is configured to receive power and/or data from the spacecraft control assembly 46. Accordingly, the propulsion system 10 is configured to be electrically integrated with and ultimately controlled by the spacecraft control assembly 46.

The PMA 30 is in fluid communication with the propellant storage assembly 22 and the thrust generator 14 for selectively controlling the supply of propellant to the thrust generator 14. In the illustrated embodiment, the PMA 30 is fluidly connected to the propellant storage assembly 22 by a line (conduit, tube, etc.) 48A, and is fluidly coupled to the thrust generator 14 by a first line 48B and a second line 48C. In other embodiments, the PMA 30 may be fluidly connected to the propellant storage assembly 22 and/or thrust generator 14 by three or more lines 48A-48C (e.g., three, four, etc.). In an exemplary embodiment, the PMA 30 includes one or more valves (e.g., mechanically actuated, electrically actuated, magnetically actuated, etc.) for selectively controlling the supply of propellant to the thrust generator 14, though the PMA 30 is not limited to valve manipulation of propellant flow. For example, the PMA 30 can include one or more variable orifices in which some or all of the variable orifices may be concurrently or independently controlled to control the supply of propellant to the thrust generator 14.

In some embodiments, the propulsion system 10 may include one or more PMAs 30. For example, in one embodiment, the propulsion system 10 may include two or more types of thrust generation and two or more separate PMAs 30. Each PMA 30 may be configured to control the supply of the propellant for one of the plurality of modes of the propulsion system 10 (e.g., EP, GD propulsion, etc.). More specifically, the first PMA 30 may be configured to supply propellant for the first mode of the thrust generator 14, and the second PMA 30 may be configured to supply propellant for the second mode of the thrust generator 14.

The (or each) PMA 30 may be dependent on the PPU 26 for operation or may have a dedicated controller or processor. In yet other embodiments, the (or each) PMA 30 may be part of a separate control assembly that is not control assembly 18.

Figure 2A:
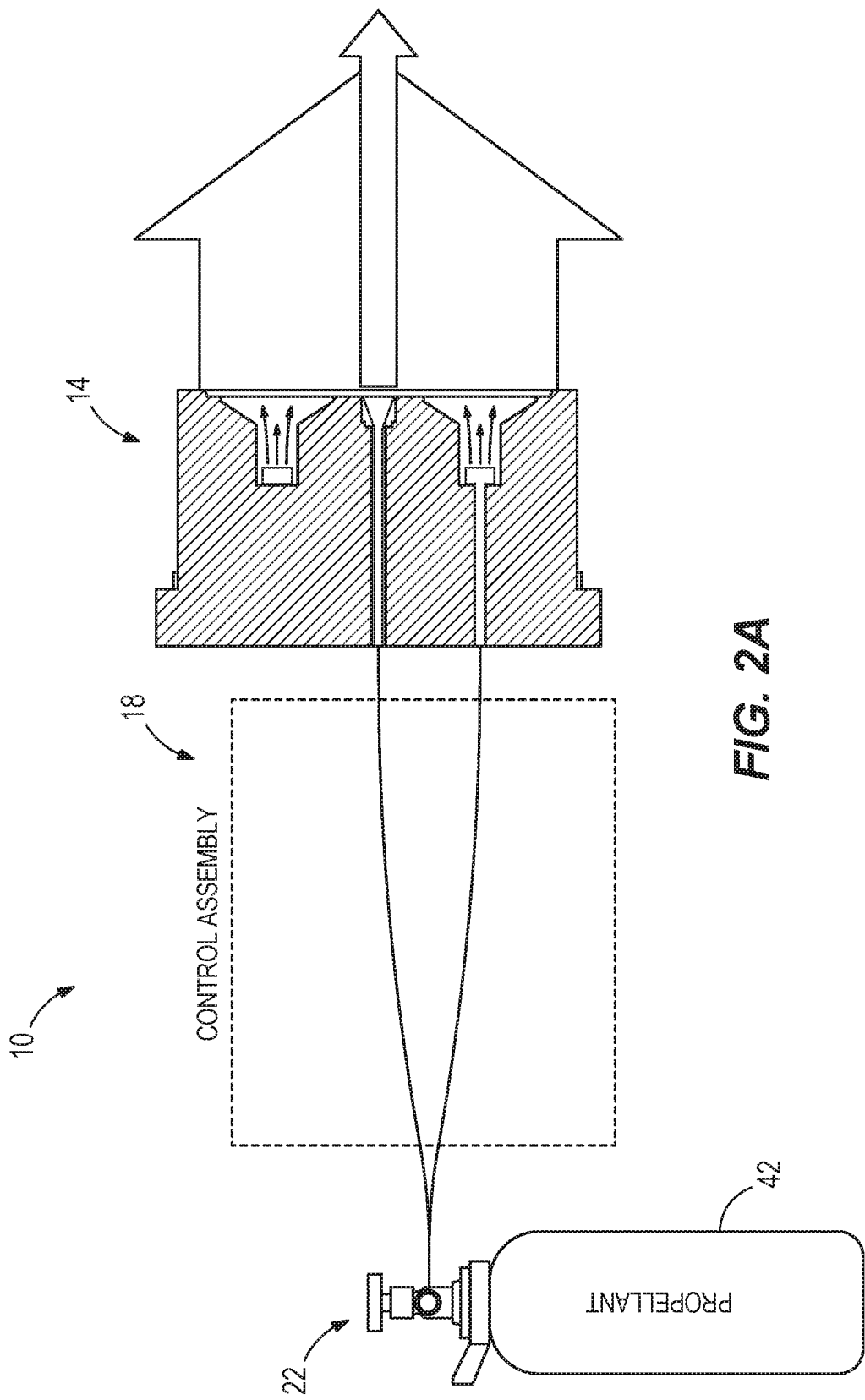
FIG. 2A is a schematic of one embodiment of the propulsion system of FIG. 1, illustrating a thrust generator connected to a single tank.
Figure 2B:
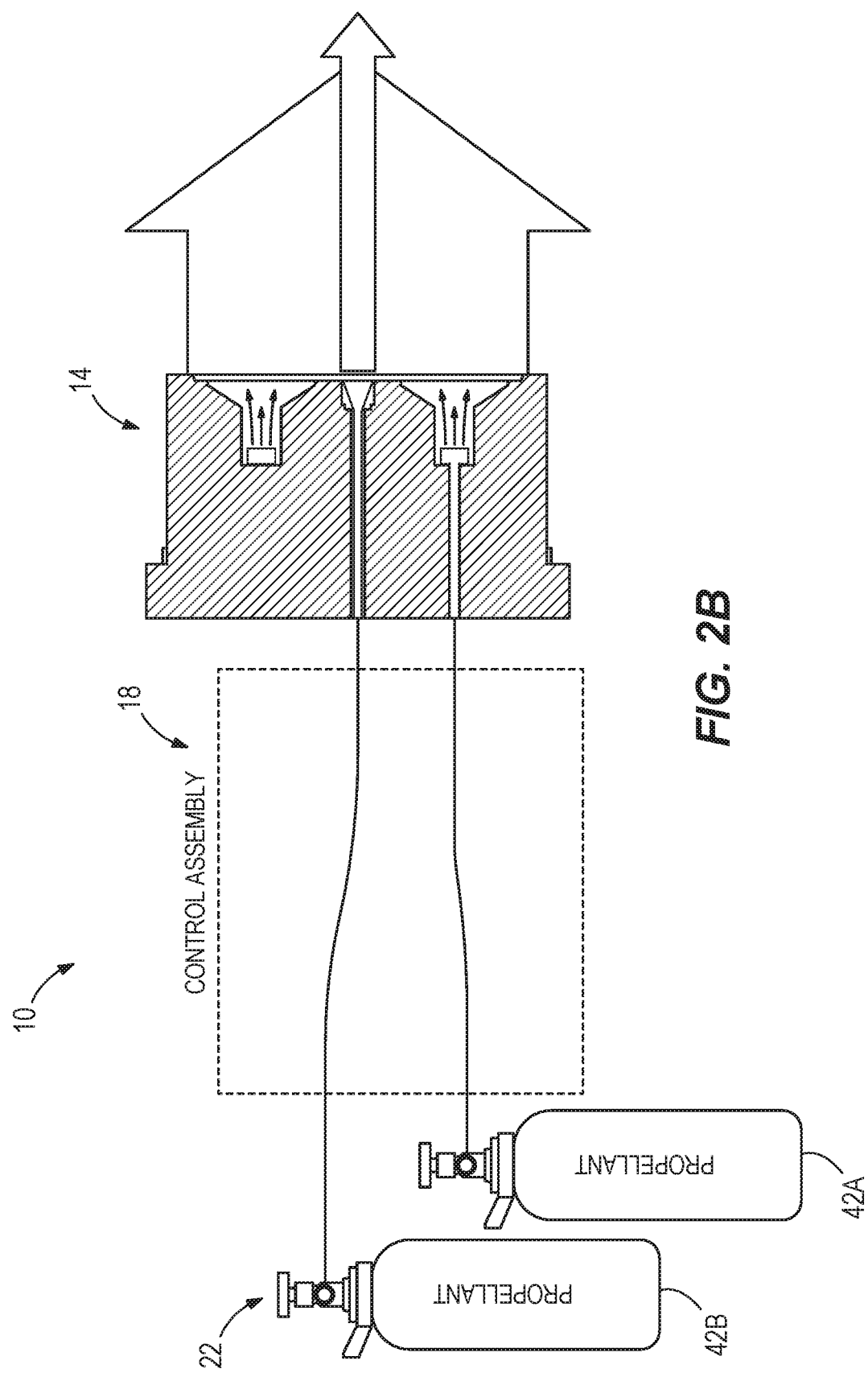
FIG. 2B is a schematic of another embodiment of the propulsion system of FIG. 1, illustrating a thrust generator connected to separate propellant tanks.

With reference to FIG. 1A, the propellant storage assembly 22 is fluidly connected to the thrust generator 14. The propellant storage assembly 22 is supported by the spacecraft and is configured to receive and contain (store) one or more types of propellant. With reference to FIGS. 1A, 2A, and 2B, the propellant storage assembly 22 may include one or more tanks 42 for holding propellant in direct communication with the PMA 30. As shown in FIG. 2A, the propellant storage assembly 22 includes one tank 42. As shown in FIG. 2B, the propellant storage assembly 22 includes two tanks 42A, 42B. The one or more tanks 42 may include one or more types of propellant. For example, with reference to FIG. 2B, the first tank 42A is configured to store a first type of propellant, and the second tank 42B is configured to store a second type of propellant. In other embodiments, the second tank 42B is also configured to store the same type of propellant as the first tank 42A. The type of propellant may include one or more of gas, liquid, and/or solid propellant. For example, the propellant may be Xenon gas, etc.

Further, in some embodiments, the one or more tanks 42 of the propellant storage assembly 22 can be used to supply the propellant for the two or more types of thrust generation. Each tank 42 may be used to supply the propellant for one, some, or all of the plurality of modes of the propulsion system 10 (e.g., EP, GD propulsion, etc.). For example, the tank 42 of the propellant storage assembly 22 may supply the propellant for the first and second modes of the thrust generator 14. Alternatively, with reference to FIG. 2B, the first tank 42A may be used to supply propellant for the first mode of the thrust generator 14, and the second tank 42B may be used to supply propellant for the second mode of the thrust generator 14. In further embodiments, the propulsion system 10 includes two or more separate PMAs 30 in fluid communication with the propellant storage assembly 22, as herein described. Each tank 42 may be used to supply the propellant for one, some, or all of the PMAs 30. For example, the first tank 42A may be used to supply propellant to one of the PMAs 30, and the second tank 42B may be used to supply propellant to another one of the PMAs 30. Accordingly, the propulsion system 10 may include the same or different number of tanks 42 and/or PMAs 30 as the number of modes of the propulsion system 10.

The control assembly 18 is configured to selectively adjust the operation of the propulsion system 10 between a plurality of modes of propulsion. More specifically, each mode represents one of the types of propulsion supported by the propulsion system 10. For example, as described the propulsion system 10 is operable in a first (e.g., EP) mode in which the thrust generator 14 uses propellant to electrostatically generate thrust and a second (e.g., GD) mode, in which the thrust generator 14 uses propellant to gas-dynamically generate thrust. In other embodiments, the propulsion system 10 may be operable in a third mode in which each type of propulsion concurrently generates thrust.

In particular, the control assembly 18 is configured to selectively control the supply of propellant to the thrust generator 14 based on the plurality of modes. For example, when the propulsion system 10 is in the first mode, the control assembly 18 is configured to supply a first flow of propellant from the propellant storage assembly 22 to the thrust generator 14, and when the propulsion system 10 is in the second mode, the control assembly 18 is configured to supply a second flow of propellant from the propellant storage assembly 22 to the thrust generator 14. Furthermore, each mode of the plurality of different modes of the thrust generator 14 may produce thrust having different characteristics. For example, in the illustrated embodiment, the first mode is configured as a relatively high specific impulse, low propellant flow mode, to achieve a relatively low thrust and the second mode is configured as a relatively low specific impulse, high propellant flow mode, to achieve a relatively high thrust.

In some embodiments, a propellant flow rate supplied to the thrust generator 14 is different for each mode of the propulsion system 10. For example, in the illustrated embodiment, the control assembly 18 is configured to allow a first propellant flow rate to the thrust generator 14 when the propulsion system 10 is in the first mode, and the control assembly 18 is configured to allow a second propellant flow rate to the thrust generator 14 when the propulsion system 10 is in the second mode. The first propellant flow rate may be higher or lower than the second propellant flow rate.

Figure 3:
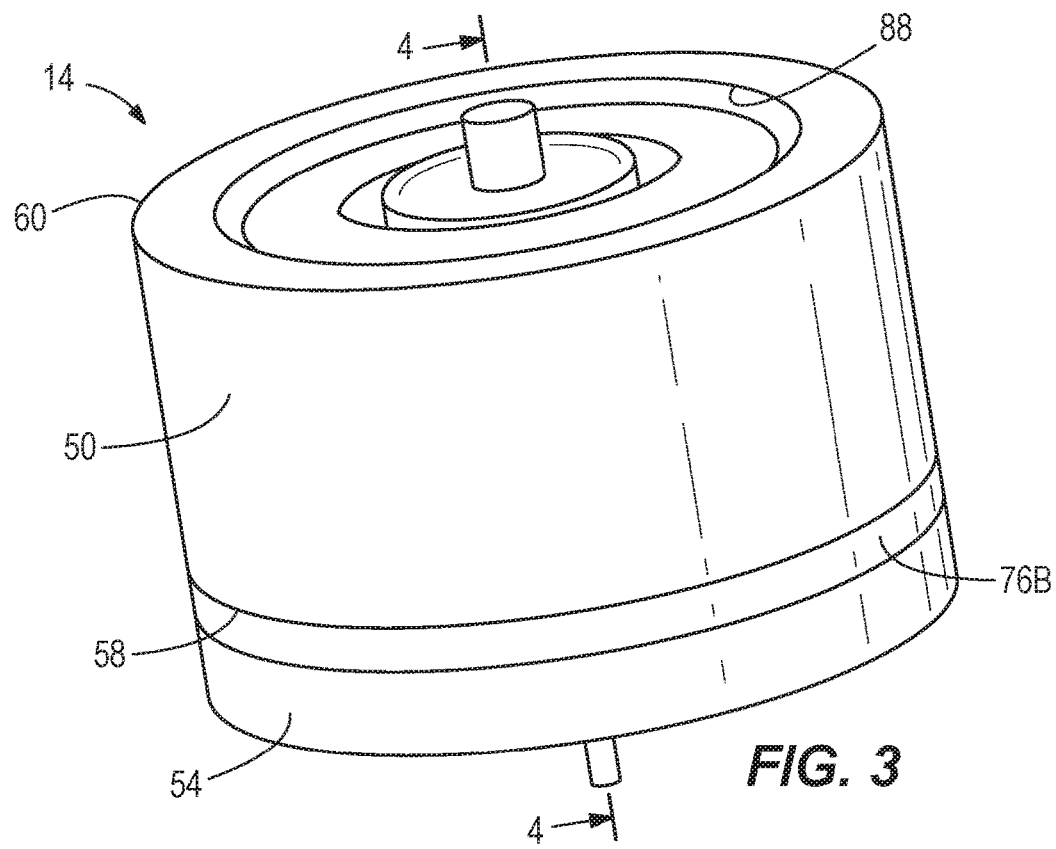
FIG. 3 is a perspective view of one embodiment of the thrust generator of the propulsion system of FIG. 1.
Figure 4:
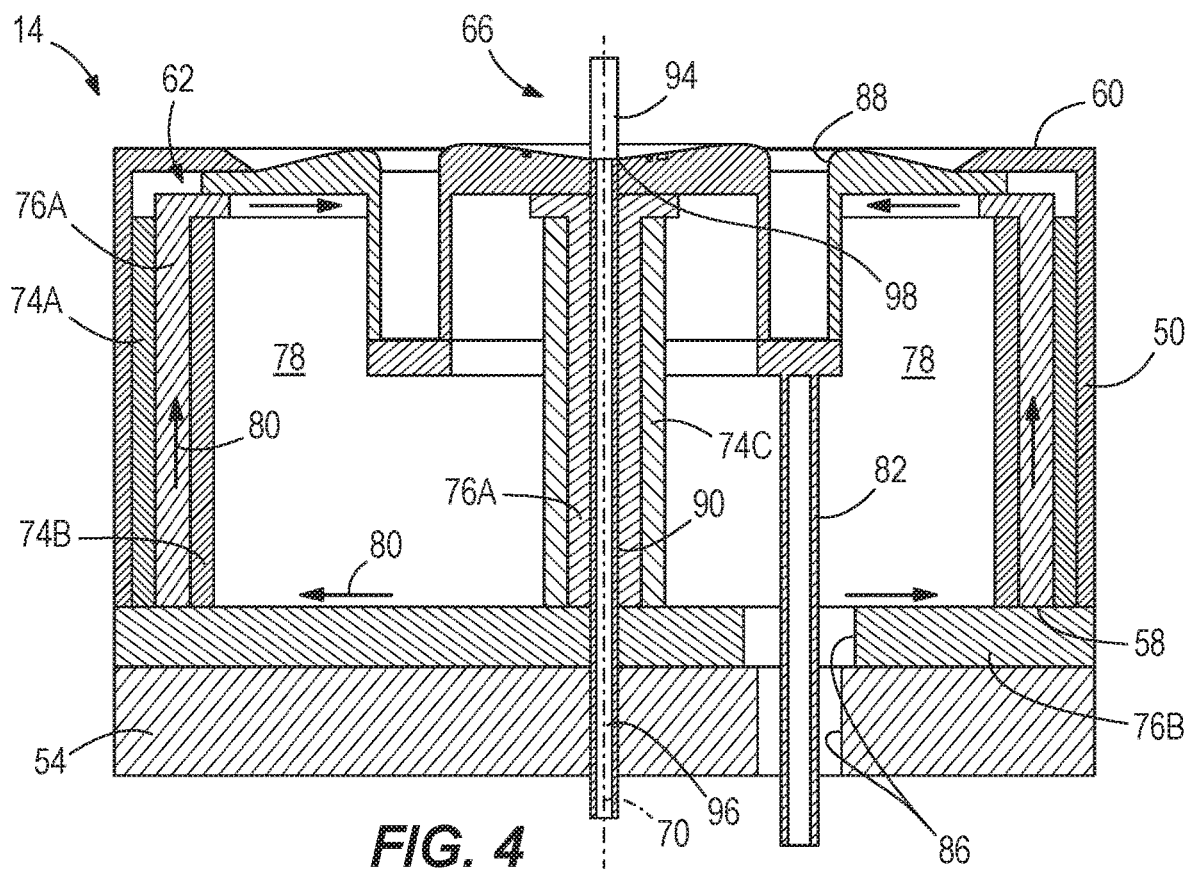
FIG. 4 is a cross-sectional view of the thrust generator of FIG. 3 taken along lines 4-4 in FIG. 3.

FIGS. 3 and 4 illustrate one embodiment of a thrust generator 14 embodying the present disclosure. The illustrated thrust generator 14 includes a housing 50 and a mount 54. The mount 54 is positioned at a first end 58 of the housing 50 and is configured to secure the thrust generator 14 to the spacecraft.

The housing 50 accommodates elements supporting a first type of propulsion, and elements supporting a second type of propulsion. More specifically, the thrust generator 14 includes an electric propulsion subsystem 62 to support the first type of propulsion, and a gas dynamic propulsion subsystem 66 to support the second type of propulsion. Accordingly, the illustrated thrust generator 14 is operable in a first mode representing the first type of propulsion and a second mode representing the second type of propulsion. Thrust generating gases in the first mode and in the second mode exit the housing 50 proximate a second end 60 of the housing 50 opposite the first end 58. In other embodiments, the housing 50 is configured to accommodate elements supporting two or more types of propulsion.

Referring to FIG. 4, the housing 50 has a hollow, generally cylindrical shape and is concentric to a central axis 70 extending longitudinally therethrough. The mount 54 is configured as a plate with a profile similar to that of the housing 50 and likewise concentric to the central axis 70. In other embodiments, the housing 50 and/or the mount 54 may have different shapes, such as cuboid, etc., and the housing 50 need not have the same shape as the mount 54.

The electric propulsion subsystem 62 of the thrust generator 14 includes magnetic field sources 74A-74C and magnetic field flux guides 76A, 76B for supporting the first mode. The magnetic field sources 74A-74C and the magnetic field flux guides 76A, 76B are arranged concentrically within the housing 50. The electric propulsion subsystem 62 further includes a discharge chamber 78 configured to receive propellant (e.g., Xenon, Krypton, Argon, etc.). More specifically, the propellant is introduced into the discharge chamber 78 through a plurality of tubes 82 (only one of which is shown in FIGS. 3-4) extending through openings 86 in the mount 54 and flux guide 76B, respectively. Furthermore, the housing 50 defines an annular propulsion outlet 88 in fluid communication with the discharge chamber 78. The thrust gases in the first mode exit the housing 50 of the thrust generator 14 via the annular propulsion outlet 88.

With continued reference to FIG. 4, the gas dynamic propulsion subsystem 66 of the thrust generator 14 includes one or more tubes 90 and one or more nozzle members 94 for supporting the second mode. In the illustrated embodiment, the gas dynamic propulsion subsystem 66 includes one tube 90 extending through the housing 50 from the first end 58 to the second end 60 and through the center magnetic field flux guide 76A of the electric propulsion subsystem 62. The tube 90 has a tube axis 96 that is collinear with the central axis 70. In other words, the tube 90 is positioned concentrically relative to the central axis 70.

The nozzle member 94 is positioned at an end 98 of the tube 90 proximate the second end 60 of the housing 50. The nozzle member 94 extends outward from the housing 50 but may also be positioned flush with or recessed within the housing 50. The nozzle member 94 is fluidly connected to the tube 90 such that propellant is configured to be supplied to the nozzle member 94 through the tube 90.

Each of the thrust gases in the first mode and the second mode exits the housing 50 of the thrust generator 14 away from the second end 60 relative to the central axis 70. In addition, the thrust gases in each of the first mode and the second mode exert a force to produce a 'resultant thrust' on the thrust generator 14. The resultant thrust generated in the first mode and the resultant thrust generated in the second mode are both effective along a common vector. In addition, in an exemplary embodiment, the resultant thrust generated in the first mode and the resultant thrust generated in the second mode are both effectively coaxial along the central axis 70.

Figure 5:
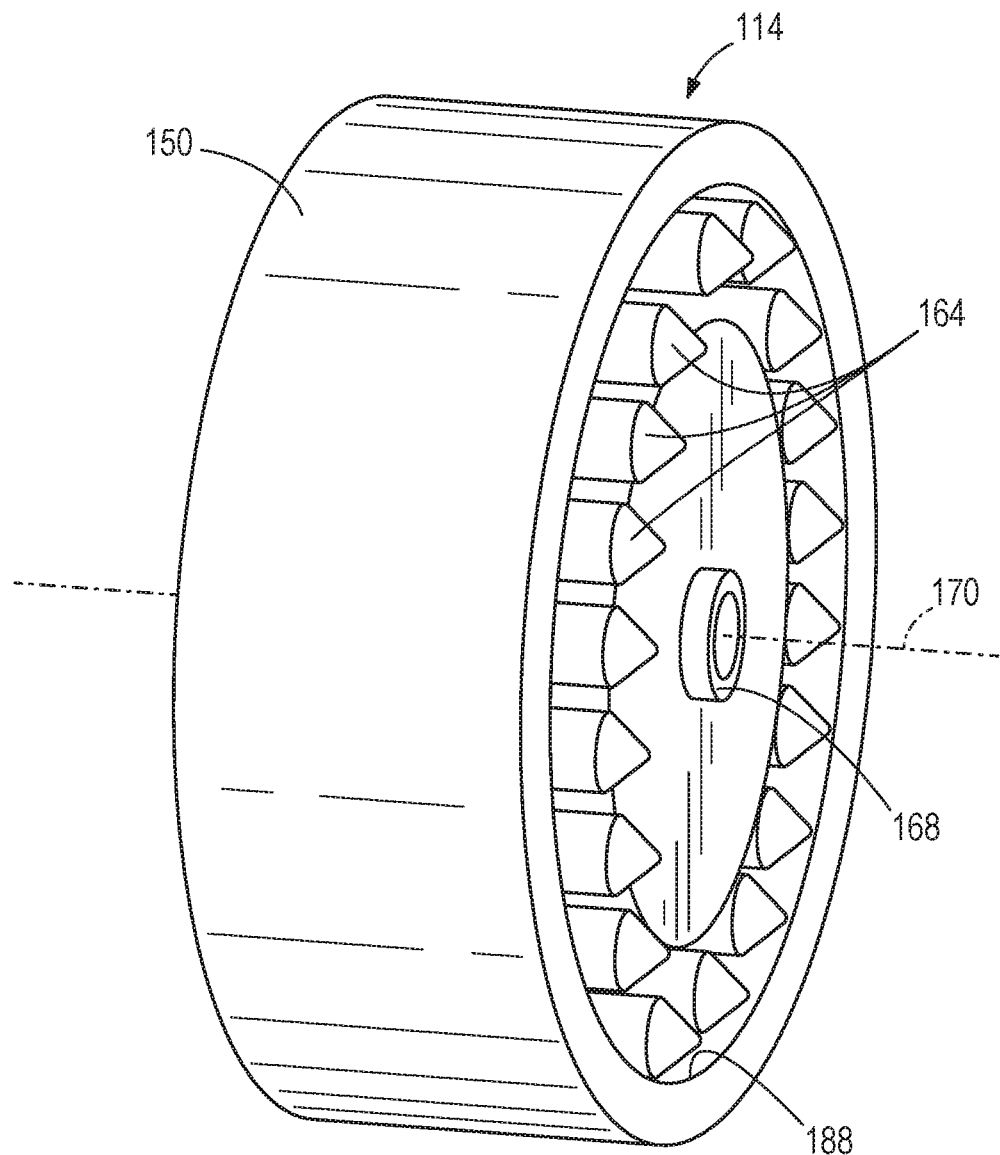
FIG. 5 is a perspective view of yet another embodiment of the thrust generator of the propulsion system of FIG. 1.

FIG. 5 illustrates another embodiment of a thrust generator 114, and like elements have been given the same reference numbers as the embodiment of the thrust generator 14 of FIGS. 3 and 4 plus 100. The thrust generator 114 includes a housing 150 accommodating a plurality of elements 164 to provide propellant flow for supporting a first mode of the thrust generator 114, and a central nozzle 168 for supporting a second mode of the thrust generator 114. The plurality of elements 164 are positioned concentrically about a central axis 170 of the housing 150. In addition, the plurality of elements 164 are positioned at and concentric with an annular propulsion outlet 188 of the housing 150. In some embodiments, the elements 164 may be electro spray or field-emission electric propulsion emitter nozzles. The elements may be configured to receive a metal propellant such as indium, gallium, or cesium, and/or a liquid propellant such as ionic liquid, and colloidal liquid, and/or any other suitable propellant configured to generate an electrostatic thrust.

Figure 6B:
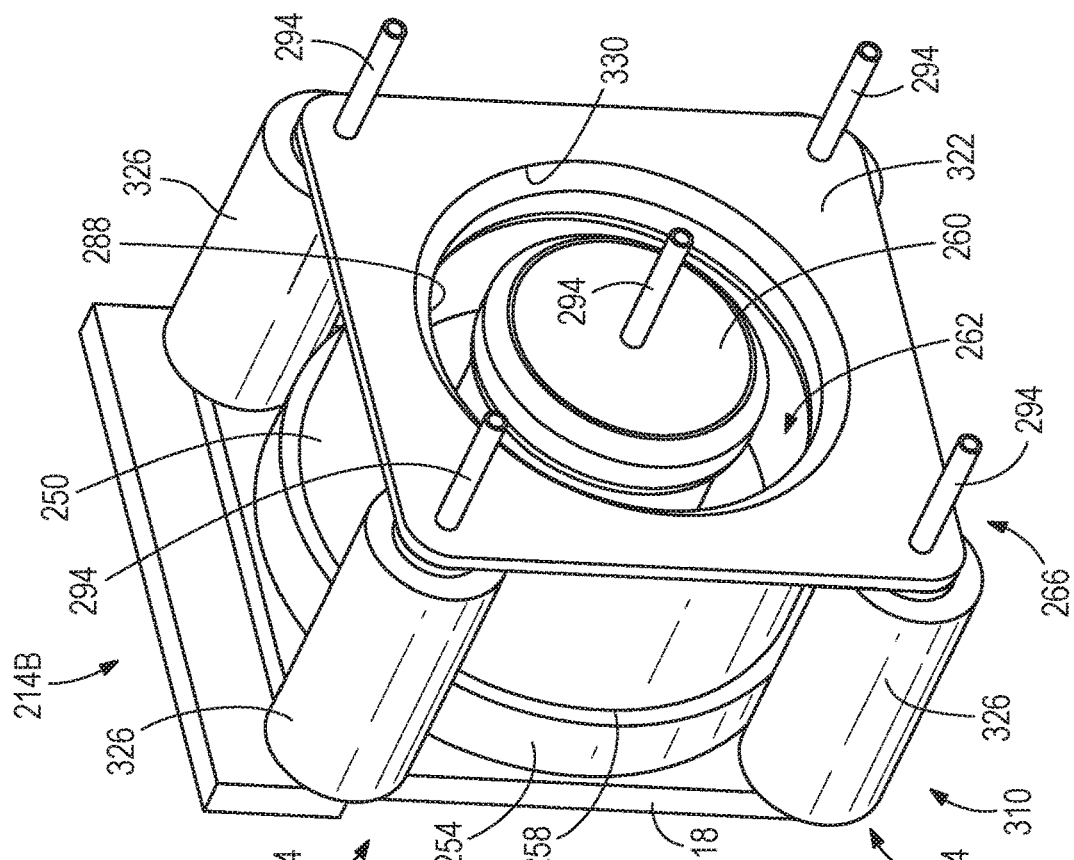
FIGS. 6A-6C are perspective views of other embodiments of the thrust generator of the propulsion system of FIG. 1.
Figure 6A:
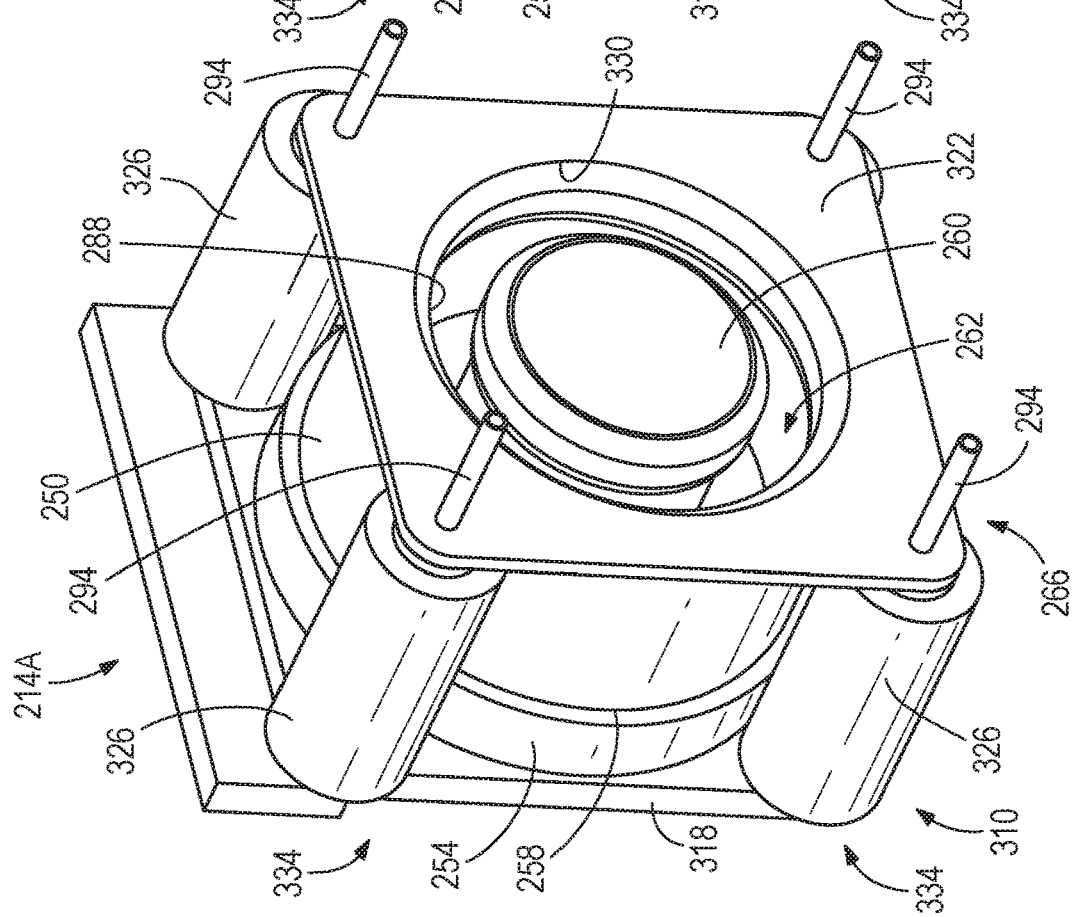
Figure 6C:
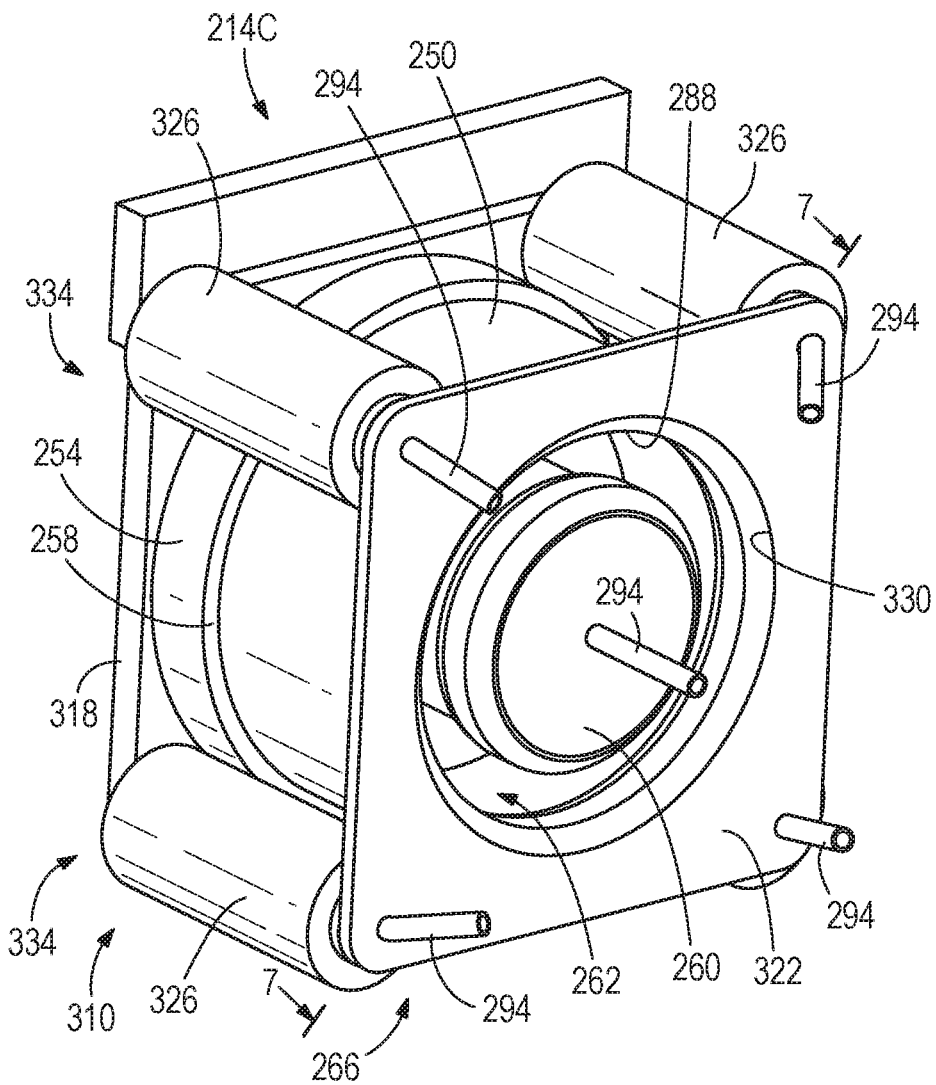

FIGS. 6A-6C each illustrate yet another embodiment of the thrust generator 214A-214C, and like elements have been given the same reference numbers as the embodiment of the thrust generator 14 of FIGS. 3 and 4 plus 200. Each thrust generator 214A-214C includes a housing 250 accommodating an electric propulsion subsystem 262 for supporting a first mode of the thrust generator 214A-214C, and a gas dynamic propulsion subsystem 266 for supporting a second mode of the thrust generator 214A-214C. A mount 254 is positioned at a first end 258 of the housing 250.

Furthermore, each thrust generator 214A-214C of FIGS. 6A-6C includes a frame 310 coupled to the mount 254. The frame 310 includes a plurality of frame members, in particular, a first plate member 318 and a second plate member 322, along with a plurality of leg members 326 extending between the first plate member 318 and the second plate member 322. The mount 254 is coupled to the first plate member 318, and the first plate member 318 is configured to secure the thrust generator 214A-C to the spacecraft.

The second plate member 322 is positioned proximate a second end 260 of the housing 250. The second plate member 322 is spaced from the first plate member 318 relative to a central axis 270 of the housing 250. The second plate member 322 defines an annular opening 330 that aligns with an annular propulsion outlet 288 of the housing 250.

Figure 7:
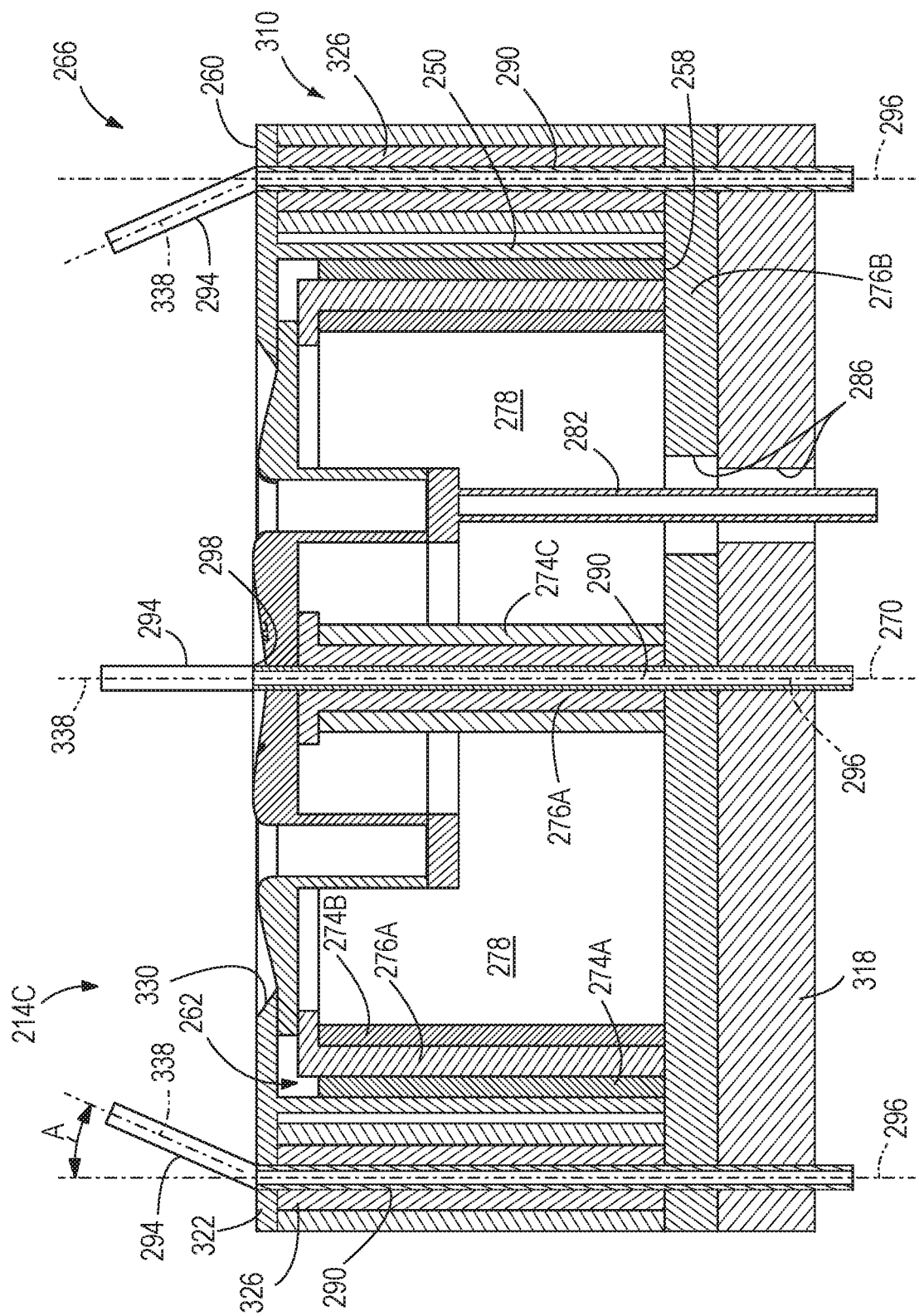
FIG. 7 is a cross-sectional view of the thrust generator of FIG. 6C taken along line 7-7 in FIG. 6C.

Each leg member 326 of the frame 310 extends parallel to the central axis 270 and is positioned radially offset relative to the central axis 270. Each plate member 318, 322 of the frame 310 has a generally rectangular shape having a plurality of corners 334. Each leg member 326 extends between the respective corners 334 of each of the first and second plate members 318, 322. Furthermore, each leg member 326 supports a tube 290. More specifically, the tube 290 extends through the leg member 326. In addition, the tube 290 extends through the first plate member 318 and the second plate member 322. The tube 290 defines a tube axis 296 (FIG. 7).

A nozzle member 294 is positioned at an end of each tube 290 (e.g., proximate the second end 260 of the respective thrust generator 214A-214C). Each nozzle member 294 is positioned adjacent the second plate member 322 and fluidly connected to the respective tube 290. The nozzle member 94 extends outward from the second plate member 322 but may also be positioned flush with or recessed within the second plate member 322.

Each of the thrust generators 214A-214C of FIGS. 6A-6C includes four tubes 290 and four nozzle members 294 positioned radially outward relative to the central axis 270 such that the respective nozzle member 294 is positioned at each corner 334 of the second plate member 322 of the respective thrust generator 214A-214C of FIGS. 6A-6C.

Like the embodiment of the thrust generator 14 of FIGS. 3 and 4, the thrust generator 214A-214C of each of FIGS. 6B and 6C also includes one tube 290 extending through the center magnetic field flux guide 276A of the electric propulsion subsystem 262. A fifth nozzle member 294 is positioned at the end 298 of the tube 290 concentrically with the central axis 270.

In some embodiments, the thrust generator 214A-214C can include one or more tubes 290/nozzle members 294, and the one or more tubes 290/nozzle members 294 may be positioned at any location relative to the frame 310 (e.g., portion of frame 310 between corners, positioned on sides of the housing 250 of the thrust generator 214A-214C, etc.). In addition, the plate members 318, 322 of the frame 310 may have any shape such as circular, pentagonal, etc., and the plate members 318, 322 may each itself have the same or different shape such that the one or more tubes 290/nozzle members 294 may be at any location relative to the plate members 318, 322.

Each of the nozzle members 294 defines a spray axis 338 extending through the respective nozzle member 294. The spray axis 338 may extend collinear with or at an oblique angle relative to the tube axis 296 of the tube 290 of the respective nozzle member 294. In addition, the spray axis 338 may extend parallel/collinear with or at an oblique angle relative to the central axis 270 of the respective thrust generator 214A-214C. For example, each spray axis 338 of the respective nozzle member 294 of FIGS. 6A and 6B extends collinear with the tube axis 296 of the tube 290 of the respective nozzle member 294 and parallel/collinear with the central axis 270 of the respective thrust generator 214A-214C.

As shown in FIGS. 6C and 7, each spray axis 338 of the nozzle member 294 that is positioned radially outward of the central axis 270, e.g., at each corner 334 of the thrust member 214A-214C, extends at a non-zero or oblique angle A relative to the tube axis 296 of the tube 290 of the respective nozzle member 294. The oblique angle A may be between 10 degrees and 80 degrees. In other embodiments, the oblique angle A may be between 30 degrees and 60 degrees. Still further, in other embodiments, the oblique angle A is 45 degrees. Additionally, each spray axis 338 of a corner nozzle member 294 extends toward the central axis 270. In other embodiments, one or more of the nozzle members 294 extends at the same or different oblique angle A. Still further, in other embodiments, one or more of the nozzle members 294 is movably coupled to the thrust generator 214A-214C such that the oblique angle A of the spray axis 338 relative to the tube axis 296 is adjustable.

Similar to the embodiment of the thrust generator 14 shown in FIGS. 3 and 4, the thrust gases in each of the first mode and the second mode exert a force to produce a 'resultant thrust' on the thrust generator 214A-214C. The resultant thrust generated in the first mode and the resultant thrust generated in the second mode are both effective along a common vector. In addition, in an exemplary embodiment of FIGS. 6A and 6B, the resultant thrust generated in the first mode and the resultant thrust generated in the second mode are both effectively coaxial along the central axis 70.

With reference to FIG. 1A, during operation of the spacecraft, the control assembly 18 receives signals via the spacecraft control assembly 46 to selectively control operation of the thrust generator 14 in one of the first mode, the second mode, the third mode, etc. The controller 34 of the PPU sends a signal to the PMA 30 representative of the selected mode. The PMA 30 accordingly adjusts the flow rate of the supply of propellant from the propellant storage assembly 22 to the thrust generator 14 in accordance with the signals received. Subsequently, the thrust generator 14 generates the thrust in accordance with the selected mode.

In one example, an operator inputs signals to the spacecraft control assembly 46 (e.g., via a user interface) to operate the propulsion system 10 in the first mode. The control assembly 18 controls the operation of the thrust generator 14 in the first mode to generate thrust having a relatively high specific impulse, with low propellant flow (i.e., low thrust). With specific reference to FIGS. 3-4, when the first mode is selected, the propellant is supplied to the discharge chamber 78 via the tube(s) 82. Voltage is applied between a cathode (not shown) positioned at or near the second, discharge end 60 and an anode (not shown) positioned at or near the first end 58 to form an electric field extending axially relative to the central axis 70 within the discharge chamber 78. A magnetic circuit (i.e., arrows 80) including the magnetic field sources 74A-74C and magnetic field flux guide material 76A creates a radially-oriented magnetic field at the second end 60. Electrons subjected to the magnetic field ionize the propellant. Subsequently, the propellant ions are accelerated by the electric field at the second end 60 for generating the thrust when the thrust generator 14 is in the first mode.

An operator may determine a different type of thrust is necessary (e.g., such as to avoid a collision) and input signals to the spacecraft control assembly 46 to operate the propulsion system 10 in the second mode in which the generated thrust has a relatively low specific impulse, with high propellant flow (i.e., high thrust). When the second mode is selected, the propellant (which is compressed in the propellant storage assembly 22; FIG. 1) flows through the tube 90, and then is subsequently expanded through the nozzle member 94 for generating the thrust at the second end 60 in the second mode.

In some embodiments, the PMA 30 may include one or more flow-control valves that deliver a precise or predetermined flow of propellant to one or more of the tubes and/or nozzles (e.g., tubes 82, 282, 90, 290, nozzles 94, 164, 168, 294) at different times and/or the same time. In some embodiments, the PMA 30 may include valves that deliver a precise or predetermined propellant flow to one tube/nozzle of a plurality of tubes/nozzles while no propellant flow is received by the remaining tubes/nozzles. In further embodiments, the PMA 30 may include one or more on/off valves that, when open, provides direct un-metered fluid connection between the propellant storage unit 22 and the tube(s)/nozzle(s) such that propellant flow is controlled by the pressure in the tank(s) 42 of the propellant storage unit 22, and the rate of propellant flow is not precisely metered.

The control assembly 18 may adjust the operation of the thrust generator 14 from the second mode to the first mode after a predetermined time period, or manually after receiving signals from the operator, etc. Accordingly, the control assembly 18 can adjust from one of the modes to another of the modes by the signals received via the spacecraft control assembly 46 and/or the controller 34 of the PPU 26.

Thus, the disclosure provides, among other things, a propulsion system 10 operable in a plurality of different modes in which each mode represents at least one of the types of propulsion supported by the propulsion system 10. Accordingly, the propulsion system 10 is configured to selectively produce thrust having different characteristics (i.e., lower thrust, higher thrust, etc.).

Accordingly, various embodiments of a thrust generator for a propulsion system 10 are described herein that enable the propulsion system 10 to operate in a plurality of different modes in accordance with at least two types of propulsion. More specifically, although the thrust generator 14 has been described as supporting EP and GD types of propulsion, the thrust generator may support one of the same or different types of propulsion, and/or may include the same or different electric propulsion subsystem elements and/or gas dynamic propulsion subsystem elements (e.g., electrospray thruster and solid motor thruster, alternatively). Although the disclosure has been described in detail with reference to certain preferred embodiments, variations and modifications exist within the scope and spirit of one or more independent aspects of the disclosure as described.

Various features of the disclosure are set forth in the following claims.

What is claimed is:

1. A thrust generator for producing thrust to move a spacecraft, the thrust generator comprising:
    a housing having a first end and an opposing second end, the first end associated with a mount for coupling to the spacecraft, the housing further defining a central axis extending through the first end and the second end, the second end defining an annular propulsion outlet;
    a tube extending through the housing from the first end to the second end and positioned concentrically with the central axis; and
    a nozzle fluidly connected to the tube,
    wherein the thrust generator is selectively operable in a first mode in which the thrust generator uses propellant to electrostatically generate thrust via the annular propulsion outlet, and a second mode in which the thrust generator uses propellant to gas-dynamically generate thrust via the nozzle.

2. The thrust generator of claim 1, wherein the nozzle is positioned at an end of the tube.

3. The thrust generator of claim 1, wherein the annular propulsion outlet and nozzle are configured such that a resultant thrust generated in the first mode and a resultant thrust generated in the second mode are both effectively coaxial along the central axis.

\* \* \* \* \*